(12) United States Patent
Yokono et al.

(10) Patent No.: US 9,605,608 B2
(45) Date of Patent: Mar. 28, 2017

(54) APPARATUS FOR CONTROLLING INTERNAL COMBUSTION ENGINE HAVING TURBOCHARGER

(71) Applicant: Mitsubishi Electric Corporation, Chiyoda-ku, Tokyo (JP)

(72) Inventors: Michihisa Yokono, Kobe (JP); Hideki Hagari, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/302,638

(22) Filed: Jun. 12, 2014

(65) Prior Publication Data
US 2015/0240731 A1 Aug. 27, 2015

(30) Foreign Application Priority Data
Feb. 25, 2014 (JP) ................................. 2014-033648

(51) Int. Cl.
| | |
|---|---|
| *F02B 33/44* | (2006.01) |
| *F02D 41/00* | (2006.01) |
| *F02B 37/18* | (2006.01) |
| *F02B 37/22* | (2006.01) |
| *F02D 41/14* | (2006.01) |

(Continued)

(52) U.S. Cl.
CPC ........ *F02D 41/0007* (2013.01); *F02B 37/183* (2013.01); *F02B 37/225* (2013.01); *F02D 11/105* (2013.01); *F02D 41/1402* (2013.01); *F02D 41/2464* (2013.01); *F02D 2041/1432* (2013.01); *F02D 2200/0404* (2013.01); *F02D 2200/0406* (2013.01); *F02D 2200/0408* (2013.01); *F02D 2200/101* (2013.01); *F02D 2200/602* (2013.01); *Y02T 10/144* (2013.01)

(58) Field of Classification Search
CPC ................. F02D 41/0007; F02D 41/18; F02D 2200/0404; F02D 2200/0406; F02B 37/18; F02B 37/16; F02B 33/44; F02B 33/446; Y02T 10/144
USPC .......................... 60/601, 605.1, 602; 701/102
See application file for complete search history.

(56) References Cited

U.S. PATENT DOCUMENTS

| 4,467,607 A * | 8/1984 | Rydquist et al. ............... 60/602 |
| 7,305,967 B1 | 12/2007 | Hagari et al. |

(Continued)

FOREIGN PATENT DOCUMENTS

JP 4237214 B2 3/2009

*Primary Examiner* — Nicholas J Weiss
*Assistant Examiner* — Ngoc T Nguyen
(74) *Attorney, Agent, or Firm* — Sughrue Mion, PLLC; Richard C. Turner

(57) ABSTRACT

In the control device, a relationship of a throttle-upstream pressure with respect to an exhaust-gas amount is used in a state where a supercharge pressure becomes the lowest by a WG-instruction value with respect to a WGV-control component 220 for driving a WGV 33a provided at a bypass passage 33 bypassing a turbocharger 32, and a relationship of a throttle-upstream pressure with respect to an aperture of a throttle valve 23, a rotational speed of an engine, and an intake-manifold pressure is used, and any of the throttle-upstream pressures, whichever is higher, being calculated in accordance with each of the relationship, is defined as a throttle-upstream-estimation value, whereby the throttle-upstream pressure is estimated by a cheap means with high accuracy so as to control the engine.

6 Claims, 5 Drawing Sheets

(51) Int. Cl.
*F02D 11/10* (2006.01)
*F02D 41/24* (2006.01)

(56) References Cited

U.S. PATENT DOCUMENTS

| | | | |
|---|---|---|---|
| 7,461,508 B2 * | 12/2008 | Rosin et al. | 60/602 |
| 2011/0010072 A1 * | 1/2011 | Burkhardt et al. | 701/102 |
| 2013/0282256 A1 * | 10/2013 | Watanuki et al. | 701/102 |
| 2014/0325982 A1 * | 11/2014 | Maruo | F02B 37/183 |
| | | | 60/602 |

* cited by examiner

APPARATUS FOR CONTROLLING INTERNAL COMBUSTION ENGINE HAVING TURBOCHARGER

BACKGROUND OF THE INVENTION

Technical Field

The present invention relates to a control device for an internal combustion engine, and particularly relates to a control device for an internal combustion engine which is installed in, for example, a turbocharger-engine car.

Background Art

In a conventional internal combustion engine, a turbocharger is used in order to improve the output of an internal combustion engine (hereinafter, referred to as engine). The turbocharger is a device by which air is forcibly inputted to the engine in such a way that the turbocharger is mounted at an intake-air passage of the engine, and a turbine of the turbocharger is rotated by exhaust gas. There is a problem in the turbocharger that a supercharge pressure is increased more than necessary under a high rotational speed and heavy load condition, and the engine is broken, so that an exhaust-bypass passage is usually provided at an upstream of a turbine. A waste-gate valve (hereinafter, referred to as WGV) is provided at the exhaust-bypass passage. The exhaust gas flowed in an exhaust passage is flowed by the WGV, whereby an inflow of the exhaust gas passed through the engine is regulated. Thereby, a pressure in the intake-air passage is controlled at an appropriate level.

In general, the WGV is driven by a positive-pressure-type actuator. An intake air passage (upstream component of a throttle valve in which a pressure is particularly increased) is linked to a waste-gate actuator (hereinafter, referred to as WGA). Therefore, when a pressure in the intake air passage of the engine, which is driven in a supercharge mode or the like, is higher than an atmospheric pressure, the WGA can be operated. A relief amount of a relief valve connected to the WGA is regulated, whereby a pressure of an intake air, which is supplied to the WGA, is regulated, and an aperture of the WGV linked to the WGA is regulated. In general, a detector for detecting an activation amount of the WGA or the WGV is not mounted on the devices. Therefore, a detection value of a pressure, such as an intake-manifold pressure (hereinafter, referred to as Pb) at a downstream side of a compressor is used, whereby the relief amount of the relief valve is regulated. In a pressure condition where the WGA can be operated, the WGV, which is used as a bypass valve, is held at a totally-enclosed position by a mechanical component, such as a spring, which is installed in the WGA.

In general, a throttle valve (hereinafter, referred to as THV) provided at an intake air passage is operated, and an aperture area of the intake air passage is regulated, whereby the output of the engine is regulated. An intake-air mount passed through the THV can be controlled based on a physical formula by using the aperture area of the THV, an upstream pressure and a downstream pressure with respect to airflow, and a detection value such as temperatures at the upstream and the downstream of the THV. These technologies are generally used (for example, refer to Patent Document 1). However, in the technologies, a sensor for detecting the upstream pressure of the THV must be installed, so that there are problems in that a number of components is increased, and a cost of the control device is increased.

Therefore, a technology for suppressing the cost is described in Patent Document 2 which is previously applied by the applicant of the present application. A supercharge pressure (hereinafter, referred to as P2) sensor for detecting the supercharge pressure, which is a pressure at an upstream of a throttle, is not used in Patent Document 2. In Patent Document 2, an exhaust-gas amount is calculated by using a detection value of an intake-air amount and a detection value of a ratio of air to fuel, and the P2 is estimated by using a comparison result of a value, which is calculated by using a table that is previously set in accordance with the exhaust-gas amount, and a value which is obtained by adding the value being previously set to the Pb.

CONVENTIONAL ART DOCUMENT

Patent Document

Patent Document 1

Japanese Patent Publication No. 4237214

Patent Document 2

Japanese Patent Application 2013-221903

SUMMARY OF THE INVENTION

Problems to be Solved by the Invention

As described above, in the technology according to Patent Document 1, there has been a problem in that the P2 sensor is used, so that the cost of the control device is increased.

In the technology according to Patent Document 2, a value, in which a predetermined vale is added to the PB, is used as the P2-estimation value in a heavy-load-operation region. Although the predetermined vale is set in a state where a pressure variation, which is caused by passing air through the THV, is estimated, when a characteristic of the control device is varied in accordance with an operation condition, an operation environment, and a mechanical difference of the THV, there have been problems in that an error between the predetermined vale and the pressure variation, which is caused by passing air through the THV, is increased, and an influence for the estimation value of the P2 is caused.

The present invention has been made to solve above-described problems, and an object of the invention is to provide a control device for an internal combustion engine by which the P2 can be estimated without receiving an influence which is caused by the characteristic variation in accordance with the operation condition, the operation environment, and the mechanical difference of the THV.

Means for Solving Problems

A control device for an internal combustion engine having a turbocharger, includes a throttle valve that is provided at an intake air passage of the internal combustion engine; a throttle-aperture-detection component for detecting an aperture of the throttle valve; a turbine that is provided at an exhaust passage of the internal combustion engine; a turbocharger having a compressor which is provided at an upstream of the throttle valve and integrally rotated with the turbine; a waste-gate valve that is provided at a bypass passage bypassing around the turbine; a waste-gate-valve-control component that modifies a flow-passage-cross-sectional area of the bypass passage by controlling the waste-gate valve; an intake-air-amount-detection component for detecting an intake-air amount in the internal combustion engine; an intake-manifold-pressure-detection component for detecting a pressure in an intake-manifold component that is provided at a downstream side of the throttle valve; a required-output-calculation component for calculating a required output that is required to the internal combustion engine based on a rotational speed of the internal combustion engine and an accelerator operation of a driver; a throttle-valve-control component that calculates a target-intake-air quantity passed through the throttle valve in accordance with the required output calculated by the required-output-calculation component, and controls an effective aperture area of the throttle valve in order to realize the target-intake-air quantity; and a supercharge-pressure-estimation component that estimates a supercharge pressure at a downstream side of the compressor and at an upstream side of the throttle valve; wherein the supercharge-pressure-estimation component includes an exhaust-gas-amount-calculation component that calculates an exhaust-gas amount in accordance with a ratio of air to fuel and an intake-air amount in the internal combustion engine; a WG0P2-calculation component that calculates a WG0P2-estimation value, which is a supercharge pressure in a waste-gate-valve-driving condition in state where a supercharge power generated by the compressor is the lowest, in accordance with the exhaust-gas amount; and a CALP2-calculation component that calculates a CALP2-estimation value, which is a supercharge pressure in a region, which includes an operation region where intake air is more supercharged than intake air in a region that can be estimated by the WG0P2-calculation component, in accordance with the effective aperture area, a rotational speed of the internal combustion engine, and a pressure in the intake-manifold component, regardless of a driving condition of the waste-gate valve; and defines the WG0P2-estimation value or the CALP2-estimation value, whichever is higher, as a final-estimation-supercharge-pressure value.

Effects of the Invention

According to the control device for an internal combustion engine having a turbocharger of the present invention, the P2 is estimated based on the Qex when a waste-gate control (hereinafter, referred to as WG control) instruction condition is seat as a condition in which the supercharge pressure is the lowest, and the P2 is estimated based on the STH, a rotational speed of the engine, and the Pb when the intake air is more supercharged by the WG control, so that the P2 can be estimated by a simple calculation process without receiving an influence which is caused by the operation condition, the operation environment, and an state of the WGV aperture.

DETAILED DESCRIPTION OF THE PREFERRED EMBODIMENT

Embodiment 1

Figure 1:
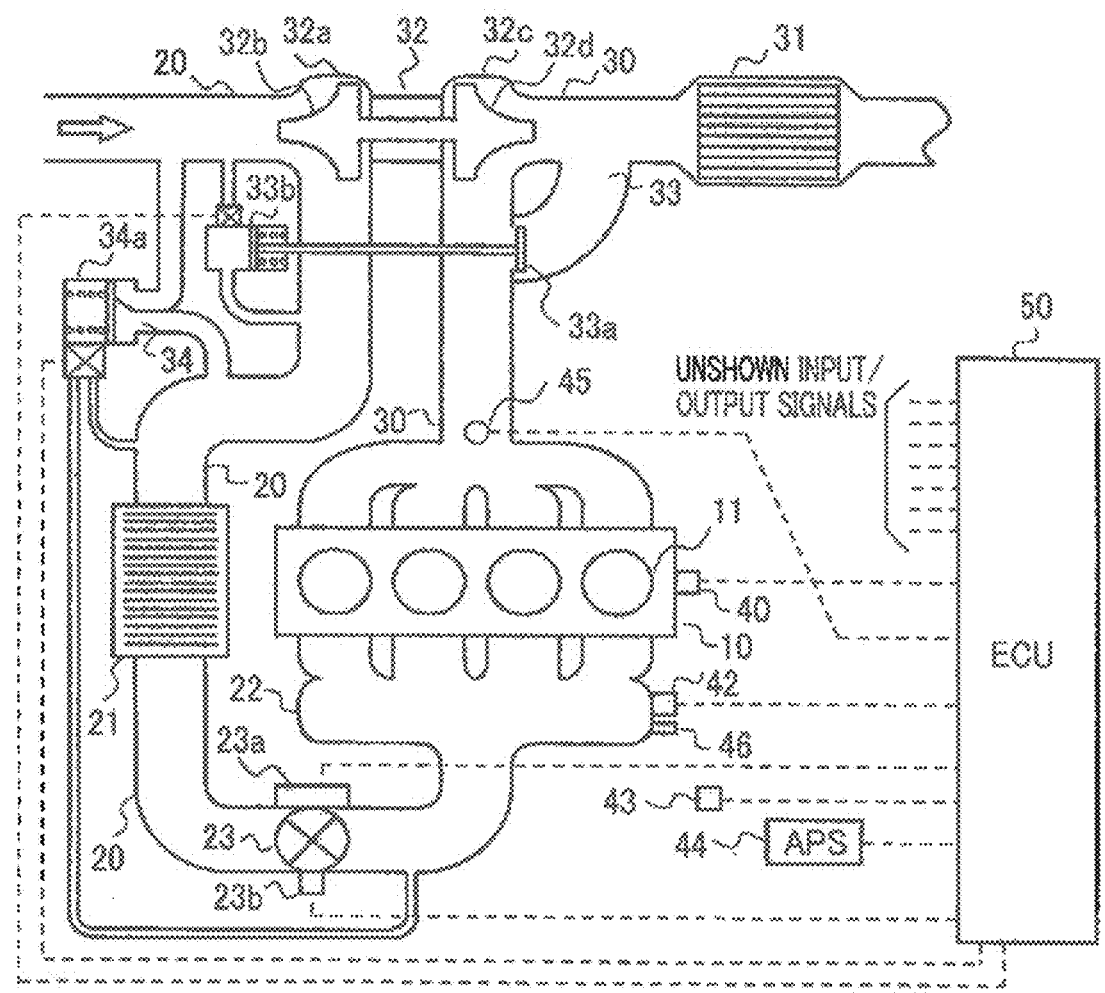
FIG. 1 is a schematic diagram illustrating a control device and peripheral configurations of an internal combustion engine, according to Embodiment 1 of the present invention.

Hereinafter, Embodiment 1 of the present invention will be explained in reference to drawings. FIG. 1 is a schematic diagram illustrating a control device and peripheral configurations of an internal combustion engine, according to Embodiment 1 of the present invention. In FIG. 1, an internal combustion engine 10 (hereinafter, referred to as engine 10) includes a combustion chamber 11. An intake air passage 20 is linked to the engine 10 via an intake manifold 22. Moreover, an exhaust passage 30 is linked to the engine 10. A turbine housing 32c for a turbocharger 32 is provided to the exhaust passage 30. A bypass passage 33 is provided between an upstream portion of the turbine housing 32c and a downstream portion of the turbine housing 32c at the exhaust passage 30. A WGV 33a, which is used for regulating a passage area of the bypass passage 33 when a WGA 33b is controlled, is provided in the bypass passage 33. Moreover, a catalyst 31 is provided at a position, which is lower side than a position where the bypass passage 33 is linked, at the exhaust passage 30.

The WGA 33b is a positive-pressure-type actuator, and a diaphragm is used in the WGA 33b. Therefore, if pressure in the intake air passage 20 at a time of, for example, operating a turbocharger is higher than atmospheric pressure, the WGV 33a can be operated by the WGA 33b. A relief valve is provided in the WGA 33b. A pressure in the diaphragm, which is composed of the WGA 33b, is regulated by regulating a relief amount of the relief valve, and the degree of opening of the WGV 33a linked to the WGA 33b. A detector for detecting actuation amounts of the WGA 33b and the WGV 33a is not generally installed in the devices. Therefore, a control amount of the WGA 33b is controlled by using a detected value of a pressure, such as a pressure in the intake manifold 22, at downstream of the turbocharger 32. In a pressure condition where the WGA 33b can be operated, in other words, in a condition where a pressure in the intake air passage 20 is not exceed the atmospheric pressure, the WGV 33a, which is used as a bypass valve, is held at a totally-enclosed position by a mechanical component, such as a spring, which is installed in the WGA 33b.

A compressor housing 32a of the turbocharger 32 is provided to the intake air passage 20. A bypass passage 34 is provided between the upstream portion of the compressor housing 32a and the downstream portion of the compressor housing 32a at the intake air passage 20. An air bypass valve (hereinafter, referred to as ABV) 34a for opening/closing a flow passage of the bypass passage 34 is provided at the bypass passage 34. An intercooler 21 is provided on the downstream of the compressor housing 32a at the intake air passage 20. A THV 23 is provided on the downstream of the intercooler 21 at the intake air passage 20.

The THV 23 is opened/closed by a throttle motor 23a (motor for driving a throttle valve). The aperture of the THV 23 is detected by a throttle position sensor (hereinafter, referred to as TPS) 23b.

A Pb sensor 42 for detecting Pb (intake-manifold pressure) is attached to the intake manifold 22.

An A/F sensor 45 for detecting a ratio between air and fuel, which compose exhaust gas, is provided in the exhaust passage 30. A P1 sensor 43 for detecting an atmospheric pressure (hereinafter, referred to as P1) is provided at outside of the engine 10. However, if the PI can be estimated by the Pb value according to a driving condition, the P1 sensor 43 may be not provided, and an estimation value of the P1 may be used as a value of the P1.

Hereinafter, a configuration of the turbocharger 32 will be explained. A centrifugal turbine is composed of the turbine housing 32c and a turbine wheel 32d which is provided in the turbine housing 32c. Moreover, a centrifugal compressor is composed of the compressor housing 32a and a compressor wheel 32b which is provided in the compressor housing 32a. The turbine wheel 32d and the compressor wheel 32b are coaxially linked by a turbine shaft 32e. Therefore, when the turbine wheel 32d is rotatably driven by the exhaust gas, the compressor wheel 32b is rotatably driven at the same time, and the intake air in the intake air passage 20 is supercharged. As described above, the turbocharger 32 is composed of the centrifugal turbine (turbine housing 32c and turbine wheel 32d) and the centrifugal compressor (compressor housing 32a and compressor wheel 32b).

A diaphragm is used in the ABV 34a. The diaphragm is operated in accordance with a pressure difference between the P2 and Pb, and the intake air is bypassed between the upstream portion and the downstream portion of the compressor housing 32a. Thereby, mechanical damage, which is caused in accordance with an abnormal rise of the supercharged air pressure, can be prevented. Moreover, a switching valve is used in the ABV 34a. The switching valve can switch the Pb, which is supplied to the ABV 34a, to the P2. The switching valve is controlled, whereby the operation timing of the ABV 34a is controlled. In a pressure condition where the ABV 34a can be operated, in other words, in a condition where a pressure difference supplied to the diaphragm is low, the bypass valve is held at a totally-enclosed position by a mechanical component, such as a spring, which is installed in the ABV 34a.

Moreover, an electronic control unit (hereinafter, referred to as ECU) 50 is provided in the engine 10. Output signals of various sensors, which are a Ne sensor 40 for detecting a crank-rotation speed (hereinafter, referred to as Ne), an accelerator position sensor (hereinafter, referred to as APS) 44, a water-temperature sensor (not illustrated) for detecting a cooling-water temperature of the engine 10, and a car-speed sensor (not illustrated) for detecting a car speed, are inputted to the ECU 50. Moreover, the ECU 50 controls actuators used for devices, such as the throttle motor 23a, the WGA 33b and the like.

The ECU 50 is mainly composed of a microcomputer including a CPU, a ROM, a RAM and the like, and executes various control programs recorded in the ROM, whereby the ECU 50 performs various control operations of the engine 10 in accordance with an operation mode of the engine 10. In other words, various sensor signals are inputted from the various sensors to the ECU 50, and a fuel-injection amount, ignition timing and the like are calculated in accordance with the sensor signals which are continually inputted, whereby the ECU 50 drives a fuel-injection device, an ignition device and the like.

Moreover, the ECU 50 calculates a target THV aperture by calculating engine output which is required by a driver in accordance with the various sensor signals, and drives the throttle motor 23a in accordance with the target THV aperture, whereby the ECU 50 regulates the THV 23 aperture by using the sensor signal from the TPS 23b. Moreover, the ECU 50 controls a WGV 33a aperture while ECU 50 controls the THV aperture. In other words, the ECU 50 outputs a control signal to the WGV 33a in such a way that the WGV 33a aperture becomes the required aperture, whereby the WGV 33a aperture is controlled. Thereby, the ECU 50 controls the THV aperture and the WGV 33a aperture, and the engine output, which is required by the driver, can be realized.

For example, a relief valve installed in the WGA 33b is composed of a solenoid. During the solenoid is driven, the P2, which is supplied to the WGA 33b, is left. The solenoid performs a duty drive according to an instruction signal which is periodically outputted from the ECU 50. When the instruction signal is a duty 0%, a relief amount becomes the lowest, and the WGV 33a is greatly driven by the P2 which is supplied to the diaphragm of the WGA 33b, and a Qex, which is bypassed the turbine, is increased. As a result, a Qex, which is supplied to the turbine, is decreased, and the engine becomes the lowest supercharge drive mode. On the other hand, when the instruction signal is a duty 100%, the relief amount becomes the highest, so that the P2, which is supplied to the diaphragm of the WGA 33b, is decreased. Thereby, the WGV 33a is thinly driven, and the Qex, which is bypassed the turbine, is decreased. As a result, a Qex, which is supplied to the turbine, is increased, and the engine becomes the highest supercharge drive mode.

Incidentally, in order to accurately control the output of the engine 10, it is required that the intake-air amount of the engine 10 is accurately detected or calculated. A method of detecting airflow amount by installing an airflow sensor in the intake air passage 20 (airflow-amount-detection method L) and a method of calculating airflow amount by receiving the Ne, the Pb, a preset correction value, and various information items inputted to the ECU 50 (airflow-amount-detection method D) are known as general arts.

Moreover, a method of calculating an amount of air passing the THV 23 by using a physical formula (airflow-amount-detection method M), in which an aperture area of the THV 23 is sought from the TPS 23b, and an upstream pressure (P2), a downstream pressure (≈Pb), an upstream temperature, and a downstream temperature of the THV 23 are used, is also known as a general art (for example, refer to paragraph [0028] in Patent Document 1).

When acceleration is required from a driver, a target air amount is calculated in accordance with a driving mode or the like, and a target THV aperture for realizing the target air amount is calculated. However, a reversal calculation of the airflow-amount-detection method M is performed at the time, and a target STH of the THV 23 is calculated in accordance with the P2 and the Pb.

When a car is driven in a constant mode in which an operation is not transient, if the airflow-amount-detection method D is used, an air mount can be detected by a cheap system configuration. On the other hand, when a reversal calculation of the airflow-amount-detection method M is performed in order to increase an engine-output-response performance at a transient drive mode, a sensor for measuring the P2 must be installed, and a cost of the device is increased.

Figure 3:
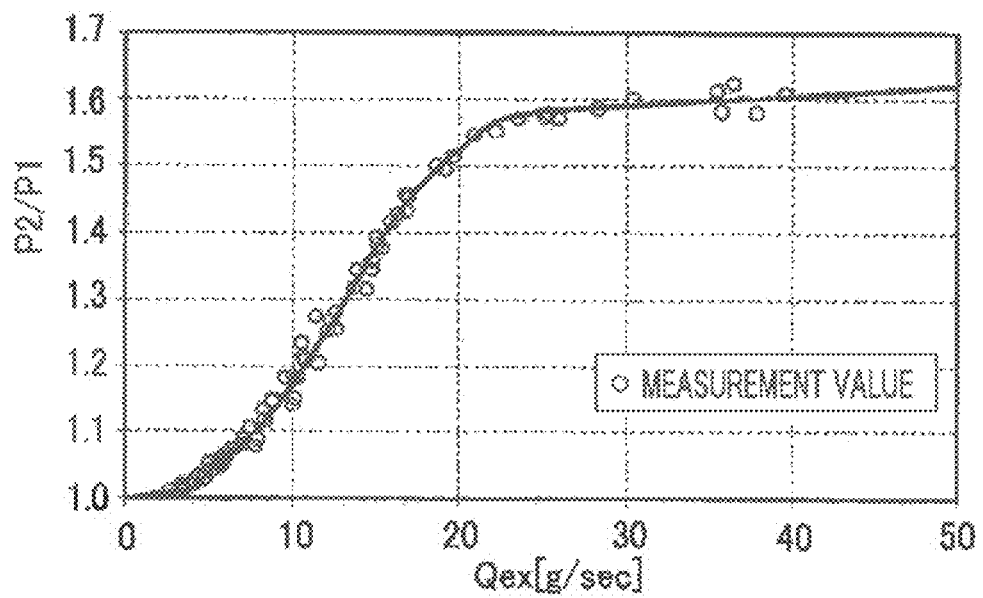
FIG. 3 is a graph illustrating a characteristic of a pressure ratio of atmospheric pressure (P1) to throttle-upstream pressure (P2) corresponding to an exhaust-gas quantity (Qex), according to Embodiment 1 of the present invention.

FIG. 3 is a graph illustrating a characteristic of a pressure ratio between atmospheric pressure (P1) and a throttle-upstream pressure (P2) corresponding to an exhaust-gas quantity (Qex), according to Embodiment 1 of the present invention, and it is indicated in FIG. 3 that a pressure ratio between the P1 and the P2 corresponding to the Qex [g/sec] in a plurality of Ne conditions, in which the instruction signal for the WGA 33b is set as a duty 0%, is measured. Moreover, it is indicated in FIG. 3 that even when the 2 sensor is not installed in a state where the instruction signal for the WGA 33b is set as a duty 0%, the pressure ratio between the P1 and the P2 can be estimated by the Qex, and the P2 can be estimated by using a product of the pressure ratio and the P1. Although the P1 is about 101.3 [kPa] when a car is driven at a flat ground near a sea, the P1 is varied to about 75 [kPa] when the car is driven at, for example, a highland of which height is 2500 m. Even when the car is driven at a highland, it is required that the estimation value is calculated by using the pressure ratio between the P1 and the P2 in order to accurately control the engine.

Figure 4:
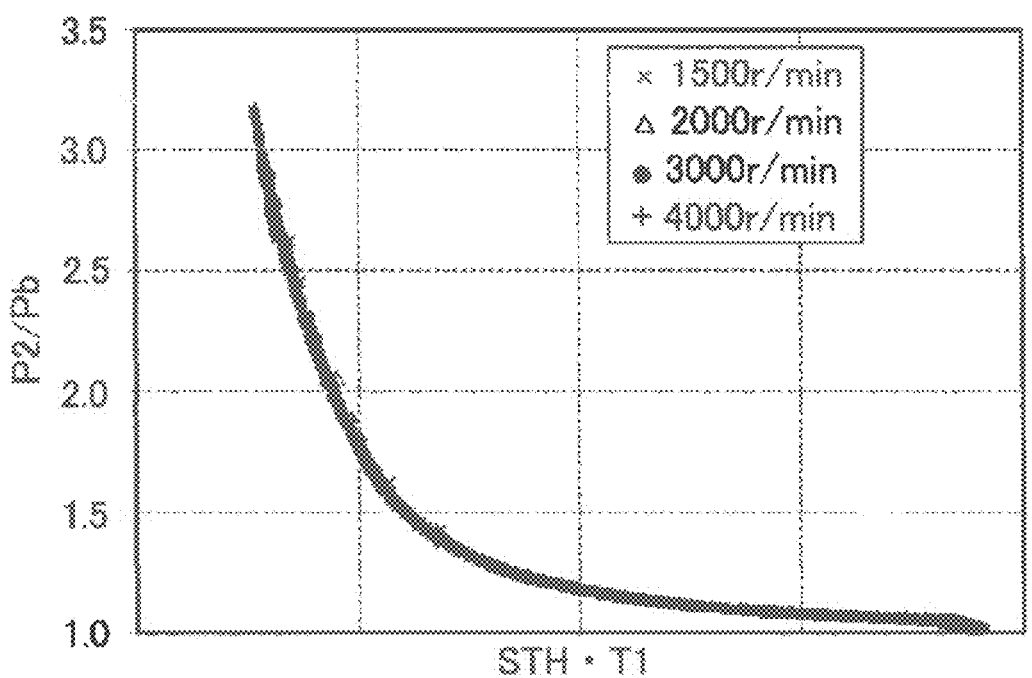
FIG. 4 is a graph illustrating a characteristic of a pressure ratio of atmospheric pressure (P1) to throttle-upstream pressure (P2) corresponding to a product of an effective aperture area (STH) of a throttle valve and a crank periodic (T1) of an engine 10, according to Embodiment 1 of the present invention.

FIG. 4 is a graph illustrating a characteristic of a pressure ratio of atmospheric pressure (P1) to throttle-upstream pressure (P2) corresponding to a product of an effective aperture area (STH) of a throttle valve and a crank periodic (T1) of an engine 10, according to Embodiment 1 of the present invention, and it is indicated in FIG. 4 that a pressure ratio between the P1 and the P2 corresponding to the Qex [g/sec] in a plurality of Ne conditions, in which the instruction signal for the WGA 33b is set as a value except for duty 0%, is measured. Moreover, it is indicated in FIG. 4 that the pressure ratio between the P2 and the Pb can be estimated by using the product of the STH and the T1 regardless of a duty condition of the instruction signal for the WGA 33b, and the P2 can be estimated by using the product of the pressure ratio and the Pb.

A relationship among STH, T1, P2, and Pb is represented by the following Formula (1). A volumetric flow measured by the so-called throttle-type flowmeter is represented by the following Formula (1).

$$Q_a = a_0 \cdot S_{TH} \cdot \sqrt{\frac{2}{\kappa-1}\left[\left(\frac{P_b}{P_2}\right)^{\frac{2}{\kappa}} - \left(\frac{P_b}{P_2}\right)^{\frac{\kappa+1}{\kappa}}\right]} \quad \text{Formula (1)}$$

Here, Qa [L/s] is defined as a rate of volumetric flow of intake air (rate of volumetric flow of throttle-upstream air), and $a_0$ [m/s] is defined as a velocity of sound in an atmosphere, and k is defined as a rate of a specific heat. When a dimensionless flow rate σ is defined and modified with respect to the Formula (1), the following Formula (2) is represented.

$$S_{TH} = \frac{Q_a}{a_0 \cdot \sigma} \quad \text{Formula (2)}$$

$$\therefore \sigma = \sqrt{\frac{2}{\kappa-1}\left[\left(\frac{P_b}{P_2}\right)^{\frac{2}{\kappa}} - \left(\frac{P_b}{P_2}\right)^{\frac{\kappa+1}{\kappa}}\right]} = f\left(\frac{P_b}{P_2}\right)$$

Here, the Qa is represented as the following Formula (3).

$$Q_a = \frac{V2}{T1} \quad \text{Formula (3)}$$

The V2 [L] is a volume of intake air that is passed through the throttle during time T1.

Incidentally, when Kv is defined as a volumetric efficiency according to an intake-manifold standard, and Vc [L] is defined as a cylinder capacity, a volumetric flow Qa' of air (volumetric flow of intake-manifold air), which is flowed in a cylinder during the time T1, is represented by the following Formula (4).

$$Q'_a = \frac{Kv \cdot Vc}{T1} \quad \text{Formula (4)}$$

When it is estimated that mass flows of Qa and Qa' are equal to each other, and temperatures at a front side and a rear side of the throttle are equal to each other, the following formula (5) is established.

$$P2 \cdot V2 = Pb \cdot Kv \cdot Vc \quad \text{Formula (5)}$$

$$\therefore V2 = \frac{Pb}{P2} \cdot Kv \cdot Vc$$

Moreover, the following formula (5) is established in accordance with the formula (2), the formula (3), and formula (5).

$$S_{TH} = \frac{Q_a}{a_0 \cdot \sigma} = \frac{V2}{a_0 \cdot \sigma \cdot T1} = \frac{Kv \cdot Vc}{a_0 \cdot \sigma \cdot T1} \cdot \frac{Pb}{P2} \quad \text{Formula (6)}$$

Moreover, because the σ is a function of a ratio between the Pb and P2, when the above-described functions are organized, the following formula (7) is established.

$$f\left(\frac{Pb}{P2}\right) = \frac{S_{TH} \cdot T1 \cdot a_0}{Kv \cdot Vc} \text{ or } \frac{Pb}{P2} = f\left(\frac{S_{TH} \cdot T1 \cdot a_0}{Kv \cdot Vc}\right) \quad \text{Formula (7)}$$

Here, the Vc described on the right side of the formula (7) is a constant, and the following formula (8) is also established when variations of the Kv and the $a_0$ are low, so that it is theoretically explained that a pressure ratio between the P2 and the Pb can be estimated in accordance with a product of the STH and the T1.

$$\frac{Pb}{P2} = f(S_{TH} \cdot T1) \quad \text{Formula (8)}$$

Figure 5:
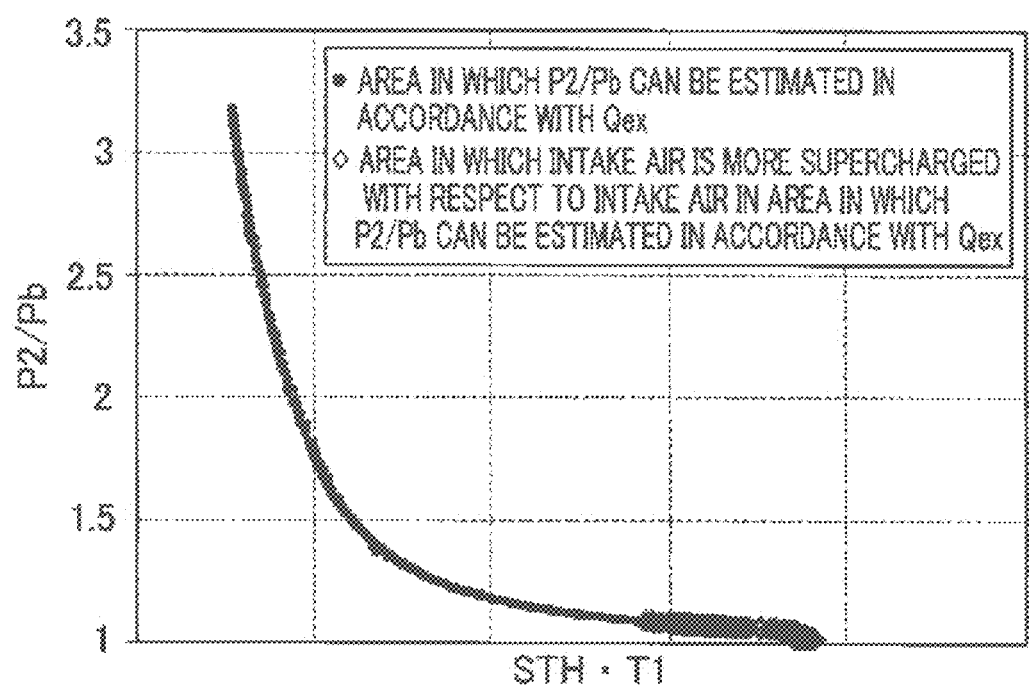
FIG. 5 is a graph illustrating association between the characteristic indicated in FIG. 3 and the characteristic indicated in FIG. 4, according to Embodiment 1 of the present invention.

FIG. 5 is a graph illustrating association between the characteristic indicated in FIG. 3 and the characteristic indicated in FIG. 4, according to Embodiment 1 of the present invention, and it is indicated in FIG. 5 that a region, in which the P2 can be estimated in accordance with the Qex measured by using FIG. 3, is discriminated from the other region in accordance with a result measured by using FIG. 4. Moreover, it is indicated in FIG. 5 that the P2 can be estimated in accordance with the Qex measured by using FIG. 3 in a region where the pressure ratio between the P2 and the Pb is roughly greater than 1.2.

Figure 2:
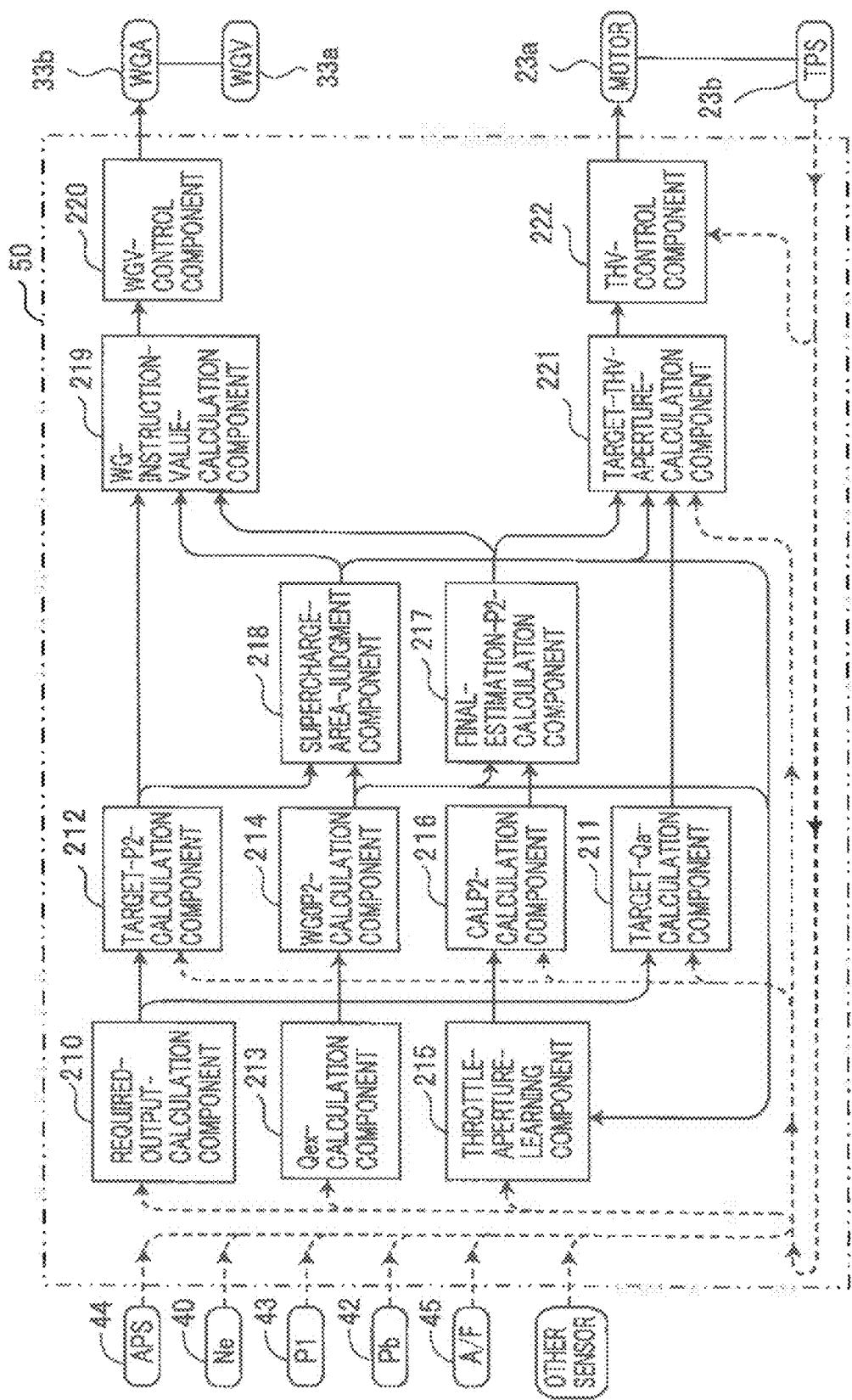
FIG. 2 is a block diagram illustrating a configuration of an ECU provided in the control device of the internal combustion engine, according to Embodiment 1 of the present invention.

Hereinafter, a configuration of the ECU 50 will be explained. FIG. 2 is a block diagram illustrating a configuration of an ECU 50 provided in the control device of the internal combustion engine, according to Embodiment 1 of the present invention, and a configuration for controlling the throttle and the waste gate in the ECU 50 is illustrated. The ECU 50 illustrated in FIG. 2 will be explained as a system for calculating an intake-air mount in the cylinder by, for example, the airflow-amount-detection method D.

As illustrated in FIG. 2, the ECU 50 includes a required-output-calculation component 210, a arget-Qa-calculation component 211, target-P2-calculation component 212, a Qex-calculation component 213, a WG0P2-calculation component 214, a throttle-aperture-learning component 215, a CALP2-calculation component 216, a final-estimation-P2-calculation component 217, a supercharge-area-judgment component 218, a WG-instruction-value-calculation component 219, a WGV-control component 220, a target-THV-aperture-calculation component 221, and a THV-control component 222. Hereinafter, these components will be explained.

The required-output-calculation component 210 calculates engine output, which is required by a driver (hereinafter, referred to as required engine output), in accordance with sensor signals outputted from various including the Ne40 and the APS 44.

The target-Qa-calculation component 211 calculates a target-air amount, which is required for realizing the required engine output, in accordance with the required engine output, which is calculated by the required-output-calculation component 210, and a driving mode of the engine 10.

The target-P2-calculation component 212 calculates a target-P2 amount, which is required for realizing the required engine output, in accordance with the required engine output, which is calculated by the required-output-calculation component 210, and a driving mode of the engine 10.

The Qex-calculation component 213 calculates a Qa by using the airflow-amount-detection method D in accordance with the driving mode of the engine 10, and calculates an exhaust-gas mount including a fuel mount in accordance with the intake-air amount and a ratio between air and fuel, which is inputted from the A/F sensor.

A relationship, which is indicated in FIG. 3, between the exhaust-gas amount and a ratio of the P2 to the P1 is previously set in the WG0P2-calculation component 214, and the ratio of the P2 to the P1 is calculated in accordance with the Qex (exhaust-gas amount) which is calculated by the Qex-calculation component 213, and a P2-estimation value (hereinafter, referred to as WG0P2-estimation value) is calculated by using a product of the P1 and the ratio of the P2 to the P1. Here, the WG0P2-estimation value is the P2-estimation value at the downstream of the turbocharger 32 and the upstream of the THV 23 in a case where it is hypothesized that the control-instruction value calculate by the WG-instruction-value-calculation component 219 (WG-instruction value) for the WGV-control component 220 is 0%.

The WG0P2-calculation component 214 records a relationship, which is previously measured, of a pressure ratio between the P1 and the WG0P2-estimation value corresponding to the Qex, to the first table in a case where it is hypothesized that the WG-instruction value for the WGV-control component 220 is 0%. The WG0P2-calculation component 214 determines the pressure ratio, which is calculated by the Qex-calculation component 213, between the P1 and the WG0P2-estimation value corresponding to the Qex by using the first table, and a product of the P1 and the pressure ratio is determined as the WG0P2-estimation value.

In addition, a filtering process using the first filter may be performed in accordance with the calculated WG0P2-estimation value. A filter gain, which is used for the first filter, is changed in accordance with the operation mode of the of the engine 10, in other words, in accordance with an acceleration mode or a deceleration mode, which is judged in accordance with a temporal progression of the Qex.

When an operation region, which is required in accordance with a result judged by the supercharge-area-judgment component 218, is not judged as a supercharge region, the throttle-aperture-learning component 215 calculates a THV-effective-aperture area according to a current operation mode (hereinafter, referred to as QaSTH) by using a calculation formula of the airflow-amount-detection method M in accordance with the Qa, the Pb, and the WG0P2-estimation value. Moreover, the throttle-aperture-learning component 215 calculates a THV-effective-aperture area corresponding to a current TPS (hereinafter, referred to as TpSTH) which is calculated by using a STH characteristic corresponding to the preset TPS. When the QaSTH is deviated from the TpSTH, the deviation is recorded as a STH learning value.

A relationship, which is indicated in FIG. 4, between a ratio of the P2 to the Pb corresponding to the product of the STH and the T1, is previously set in the CALP2-calculation component 216, and the ratio of the P2 to the Pb is calculated in accordance with a product of the T1 and the THV-effective-aperture area (hereinafter, referred to as LnSTH) which is corrected, by using the STH learning value calculated by the throttle-aperture-learning component 215, toward the THV-effective-aperture area corresponding to the current TPS which is calculated by using a characteristic being previously set by the TPS, and a P2-estimation value (hereinafter, referred to as CALP2-estimation value) is calculated in accordance with the product of the PB and the ratio of the P2 to the Pb. Here, the CALP2-estimation value is not related to the control-instruction value (WG-instruction value) for the WGV-control component 220, which is calculated by the WG-instruction-value-calculation component 219, and indicates a P2-estimation value at the downstream of the turbocharger 32 and the upstream of the THV 23.

Regardless of the WG-instruction value for the WGV-control component 220, the CALP2-calculation component 216 records a relationship of a pressure ratio between the Pb and the CALP2-estimation value, which is previously measured, corresponding to the product of the T1 and the STH to the second table. It is indicated in reference to FIG. 5 that the P2 can be estimated by using the WG0P2-estimation value in a region where the pressure ratio (P2 to Pb) is roughly higher than 1.2, and a variation of the pressure ratio (P2 to Pb) corresponding to a variation of the product of the T1 and the STH is increased in a region where the pressure ratio (P2 to Pb) is high, and an influence for stability of the P2-estimation value may be enhanced, so that the pressure ratio (P2 to Pb) is set in the second table in accordance with the characteristic indicated in FIG. 4 in a state where 1.2 is an upper limit of the pressure ratio (P2 to Pb). The CALP2-calculation component 216 determines a pressure ratio between the Pb and the CALP2-estimation value corresponding to a product of the T1 and the LnSTH by using the second table, and a product of the pressure ratio and the Pb is determined as the CALP2-estimation value.

The final-estimation-P2-calculation component 217 compares the WG0P2-estimation value, which is calculated by the WG0P2-calculation component 214, with the CALP2-estimation value, which is calculated by the CALP2-calculation component 216, and the WG0P2-estimation value or the CALP2-estimation value, whichever is higher, is defined as a final-estimation P2.

The supercharge-area-judgment component 218 compares the target-P2 value, which is calculated by the target-P2-calculation component 212, with the WG0P2-estimation value, which is calculated by the WG0P2-calculation component 214, and when the target-P2 value is greater than the WG0P2-estimation value, it is judged that the required operation area is the supercharge area.

The WG-instruction-value-calculation component 219 changes control in accordance with a result judged by the supercharge-area-judgment component 218. When the required operation area is not a supercharge area, a value 0%, by which the supercharge pressure becomes the lowest, is outputted as a WG-instruction value. On the other hand, when the required operation area is a supercharge area, a WG-instruction value, which is regulated in such a way that the final-estimation-P2 value becomes the target-P2 value, is outputted so as to perform feedback control.

The WGV-control component 220 drives the WGA 33b in accordance with a WG-instruction value which is calculated by the WG-instruction-value-calculation component 219. Thereby, the WGV 33a is linked to the WGA 33b so as to be operated as described above.

The target-THV-aperture-calculation component 221 can change a control operation in accordance with a result judged by the supercharge-area-judgment component 218. In other words, when it is judged that the required operation area is not the supercharge area, the target-THV-aperture-calculation component 221 calculates a target-THV aperture in accordance with the target-air amount, which is calculated by the target-Qa-calculation component 211, the final-estimation-P2 value, which is calculated by the final-estimation-P2-calculation component 217, and the Pb value. Specifically, the target-THV-aperture-calculation component 221 uses, for example, a reverse calculation method of the airflow-amount-detection method M, and calculates the aperture area of the THV 23 used as the target-THV aperture by which the target air mount, which is calculated by the target-Qa-calculation component 211, can be realized (for example, refer to paragraph [0036] in Patent Document 1). On the other hand, when it is judged that the required operation area is the supercharge area, the target-THV aperture is calculated in accordance with the press amount, which is detected by the APS 44, of an accelerator pedal pressed by a driver. In addition, when it is judged that the required operation area is the supercharge area, the target-THV aperture corresponding to the detected value of the APS 44 may be an aperture amount corresponding to, for example, the detection value detected by the APS 44, or may be calculated by using a characteristic which is previously set by using the Ne40, a car speed or the like.

Figure 6:
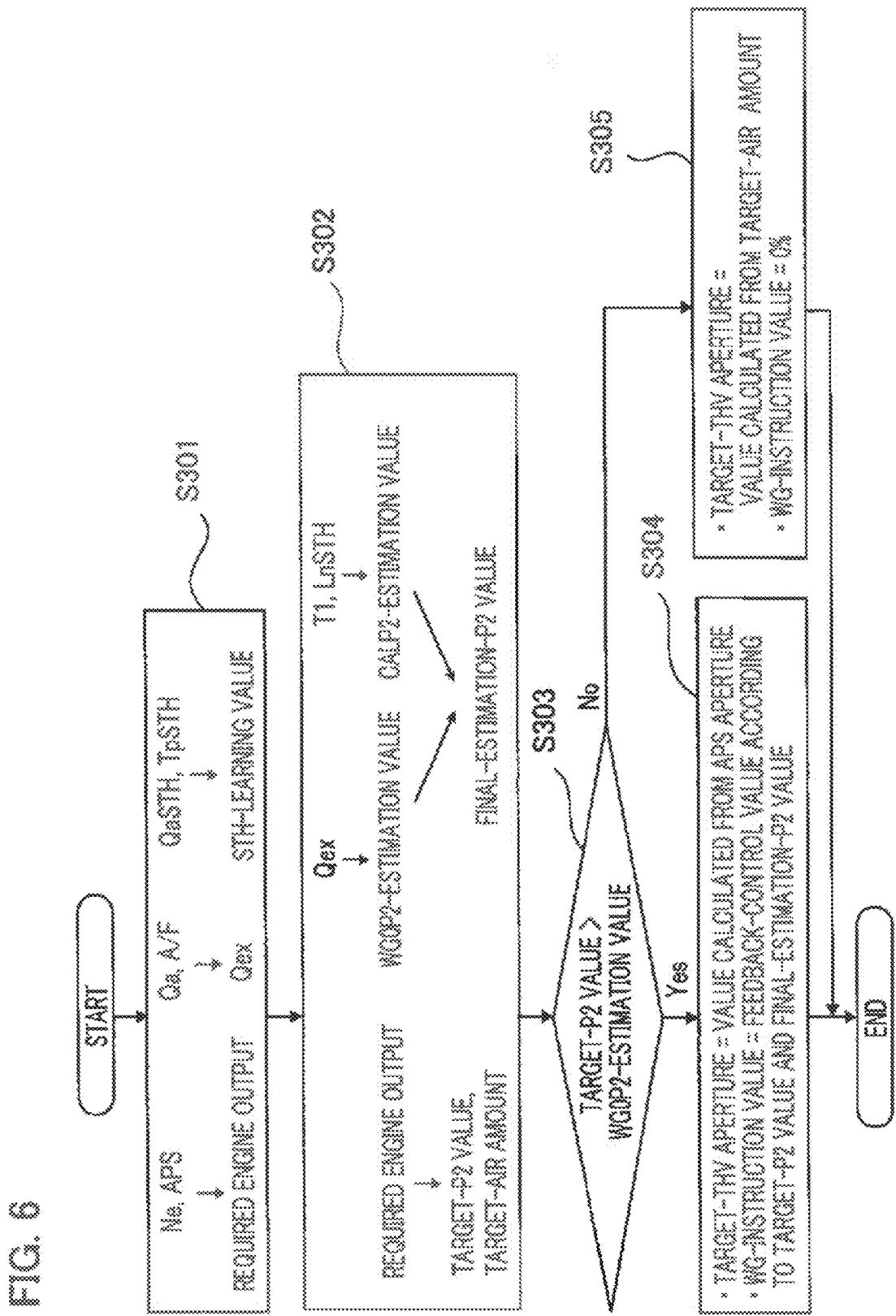
FIG. 6 is a flowchart illustrating an operation of the ECU provided in the control device of the internal combustion engine, according to Embodiment 1 of the present invention.

The THV-control component 222 drives the throttle motor 23a by a feedback control method, in accordance with the target-THV aperture calculated by the target-THV-aperture-calculation component 221, in such a way that the THV aperture detected by the TPS 23b becomes the target-THV aperture. Hereinafter, a control operation realized by the ECU 50 will be explained in reference to FIG. 6. FIG. 6 is a flowchart illustrating a throttle-control process and a waste-gate-control process, which are performed by the ECU 50, and the processes are repeated in a predetermined periodic interval.

Processes of blokes 210, 213, and 215 in the bloke diagram, which is illustrated in FIG. 2, are executed in step S301, and the process proceeds to step S302 after the processes are terminated. In other words, in step S301, the required-output-calculation component 210 calculates the required output from a driver in accordance with the press amount of the accelerator pedal, which is detected by the APS 44, and the Qex-calculation component 213 calculates the Qex in accordance with the Qa and a ratio of air to fuel, and the throttle-aperture-learning component 215 calculates the STH-learning value in accordance with the Qa, the Pb, the WG0P2 estimation value, and the TPS.

Processes of blokes 211, 212, 214, 216 and 217 in the bloke diagram, which is illustrated in FIG. 2, are executed in step S302, and the process proceeds to step S303 after the processes are terminated. In other words, in step S302, the target-Qa-calculation component 211 calculates the target-air amount in accordance with the required-engine-output value, and target-P2-calculation component 212 calculates the target-P2 value in accordance with the required-engine-output value, and the WG0P2-calculation component 214 calculates the WG0P2-estimation value in accordance with the Qex and the P1, and the CALP2-calculation component 216 calculates the CALP2-estimation value in accordance with the Ne, the TPS, the STH-learning value, and the Pb, and the final-estimation-P2-calculation component 217 calculates the final-estimation-P2 value in accordance with the WG0P2-estimation value and the CALP2-estimation value.

Process of bloke 218, which is illustrated in FIG. 2, is executed in step S303. In other words, the target-P2 vale, which is calculated by the arget-P2-calculation component 212, is compared with the WG0P2-estimation value which is calculated by the WG0P2-calculation component 214. After the values are compared, if the target-P2 vale is greater than the WG0P2-estimation value, the process proceeds to step S304, or the process proceeds to step S305 in the other case.

Processes of blokes 219, 220, 221, and 222 in the bloke diagram, which is illustrated in FIG. 2, are executed in step S304 in a state where the target-P2 value is greater than the WG0P2 estimation value. In other words, the target-THV-aperture-calculation component 221 calculates the target-THV aperture in accordance with the press amount of the accelerator pedal, which is detected by the APS 44. Moreover, the WG-instruction-value-calculation component 219 calculates the WG-instruction value, by which the final-estimation-P2 value is become to the target-P2 value, and the feedback control is performed.

Processes of blokes 219, 220, 221, and 222 in the bloke diagram, which is illustrated in FIG. 2, are executed in step S305 in a state where the target-P2 value is lower than the WG0P2 estimation value. In other words, the target-THV-aperture-calculation component 221 calculates the target-THV aperture in accordance with the target-air amount, the final-estimation-P2 value, and the Pb. Moreover, the WG-instruction-value-calculation component 219 sets a value 0% as the WG-instruction value, by which a supercharged air amount becomes the lowest.

As described above, the control device for an internal combustion engine according to Embodiment 1 includes a throttle valve 23 that is provided at an intake air passage 20 of the internal combustion engine 10; a throttle-aperture-detection component 23b for detecting an aperture of the throttle valve; turbines 32c and 32d which are provided at an exhaust passage 30; a turbocharger having compressors 32a and 32b which are provided at an upstream of the throttle valve 23 and integrally rotated with the turbine; a waste-gate valve 33a that is provided at a bypass passage 33 bypassing around the turbine; a waste-gate-valve-control component 220 that modifies a flow-passage-cross-sectional area of the bypass passage by controlling the waste-gate valve; an intake-air-amount-detection component for detecting an intake-air amount in the internal combustion engine 10; an intake-manifold-pressure-detection component 42 for detecting a pressure in an intake-manifold component 22 that is provided at a downstream side of the throttle valve 23; a required-output-calculation component 210 for calculating a required output that is required to the internal combustion engine 10 based on a rotational speed of the internal combustion engine 10 and an accelerator operation of a driver; a throttle-valve-control component 222 that calculates a target-intake-air quantity passed through the throttle valve 23 in accordance with the required output calculated by the required-output-calculation component, and controls an effective aperture area of the throttle valve 23 in order to realize the target-intake-air quantity; and a supercharge-pressure-estimation component that estimates a supercharge pressure at a downstream side of the compressor and at an upstream side of the throttle valve; wherein the supercharge-pressure-estimation component includes an exhaust-gas-amount-calculation component 213 that calculates an exhaust-gas amount in accordance with a ratio of air to fuel and an intake-air amount in the internal combustion engine 10; a WG0P2-calculation component 214 that calculates a WG0P2-estimation value, which is a supercharge pressure in a waste-gate-valve-driving condition in state where a supercharge power generated by the compressor is the lowest, in accordance with the exhaust-gas amount; and a CALP2-calculation component 216 that calculates a CALP2-estimation value, which is a supercharge pressure in a region, which includes an operation region where intake air is more supercharged than intake air in a region that can be estimated by the WG0P2-calculation component 214, in accordance with the effective aperture area, a rotational speed of the internal combustion engine, and a pressure in the intake-manifold component, regardless of a driving condition of the waste-gate valve; and defines the WG0P2-estimation value or the CALP2-estimation value, whichever is higher, as a final-estimation-supercharge-pressure value.

Thereby, the supercharge pressure at upstream of the throttle valve can be accurately estimated regardless of a driving condition of the waste-gate valve.

In Embodiment 1, it is preferred that the throttle-valve-control component 222 includes a throttle-aperture-learning component 215 that learns and corrects, in a waste-gate-valve-drive condition where a supercharge pressure obtained by the compressor becomes the lowest, the effective aperture area of the throttle valve which is calculated in accordance with the intake-air amount, a pressure in the intake-manifold component, and the WG0P2-estimation value, and a relationship, which is previously set by using the aperture of the throttle valve, between the aperture of the throttle valve and the effective aperture area of the throttle valve; and the CALP2-calculation component calculates the CALP2-estimation value in accordance with the effective aperture area of the throttle valve 23, which is learned and corrected, the rotational speed of the internal combustion engine 10, and the pressure in the intake-manifold component; and defines the WG0P2-estimation value or the CALP2-estimation value, whichever is higher, as a final-estimation-supercharge-pressure value.

Thereby, when a mechanical deviation is caused on a characteristic of the effective aperture area of the throttle valve with respect to the opening-detection value of the throttle valve, the supercharge pressure at the upstream of the throttle valve can be accurately detected.

In Embodiment 1, it is preferred that he WG0P2-calculation component 214 is configured in such a way that the component memorizes a result as a first table, which is obtained by previously measuring a pressure-ratio relationship between an atmospheric pressure and the WG0P2-estimation value corresponding to the exhaust-gas amount, in a waste-gate-valve state where a supercharge pressure, which is obtained by the compressor, is decreased to the lowest pressure by an instruction value for the waste-gate-valve-control component 220; and determines the WG0P2-estimation value corresponding to the exhaust-gas amount by using the first table.

Thereby, the ECU 50 can calculate the supercharge pressure at the upstream of the throttle valve without needing a complicate calculation process such as a model calculation.

In Embodiment 1, it is preferred that the WG0P2-calculation component 214 performs a filtering process, by using a filter including a predetermined filter constant, with respect to the calculated WG0P2-estimation value.

Thereby, when the supercharge pressure at the upstream is drastically changed by an excessive operation, an estimation value corresponding to a real pressure can be calculated.

In Embodiment 1, it is preferred that the CALP2-calculation component 216 memorizes a relationship, as a second table, among the effective aperture area of the throttle valve 23, the speed of the internal combustion engine 10, the pressure in the intake-manifold component, and the supercharge pressure, which are previously measured as a state except for the waste-gate-valve state where a supercharge pressure, which is obtained by the compressor, is decreased to the lowest pressure by an instruction value for the waste-gate-valve-control component 220; and determines a pressure ratio between the pressure in the intake-manifold and the supercharge pressure, by using the second table, in accordance with the effective aperture area and the rotational speed of the internal combustion engine 10.

Thereby, the ECU 50 can calculate the supercharge pressure at the upstream of the throttle valve without needing a complicate calculation process such as a model calculation.

In Embodiment 1, it is preferred that a target-supercharge-pressure-calculation component 212, which calculates a target-supercharge-pressure value in accordance with the required output, is provided; and when the target-supercharge pressure is higher than the WG0P2-estimation value, the waste-gate-valve-control component 220 controls the waste-gate valve in such a way that the final-estimation-supercharge-pressure value becomes the target-supercharge-pressure value.

Thereby, whenever the internal combustion engine 10 is driven at an operation region in which supercharged air is required by a WGV regulation, the supercharge condition corresponding to the required output can be accurately regulated.

In addition, it is possible in the scope of the present invention that the embodiment is suitably modified or omitted.

What is claimed is:
1. An apparatus comprising:
  a throttle valve that is provided at an intake air passage of an internal combustion engine;
  a throttle aperture sensor configured to detect an aperture of the throttle valve;
  a turbocharger having a compressor provided at an upstream side of the throttle valve, and a turbine provided at an exhaust passage of the internal combustion engine, the compressor being integrally rotated with the turbine;

a waste-gate valve that is provided at a bypass passage bypassing around the turbine;

an intake manifold pressure sensor configured to detect a pressure in an intake-manifold component that is provided at a downstream side of the throttle valve; and an electronic control unit (ECU) which is configured to:

control modification of a flow-passage-cross-sectional area of the bypass passage by controlling the waste-gate valve;

determine an intake-air amount in the internal combustion engine;

calculate a required output that is required for the internal combustion engine, based on a rotational speed of the internal combustion engine and an accelerator operation of a driver;

calculate a target-intake-air quantity passed through the throttle valve in accordance with the required output, and control an effective aperture area of the throttle valve in order to realize the target-intake-air quantity; and estimate a supercharge pressure at a downstream side of the compressor and at the upstream side of the throttle valve, by:

calculating an exhaust-gas amount in accordance with a ratio of air to fuel and the intake-air amount in the internal combustion engine;

calculating a WG0P2-estimation value, which is the supercharge pressure in a waste-gate-valve-driving condition in a state where the waste-gate valve is provided with an instruction of a 0% duty cycle, in accordance with the exhaust-gas amount;

calculating a CALP2-estimation value, which is the supercharge pressure in a region, which includes an operation region where an intake air is more supercharged than the intake air in a region that can be estimated by the calculating the WG0P2-estimation value, in accordance with the effective aperture area, the rotational speed of the internal combustion engine, and the pressure in the intake-manifold component, regardless of a driving condition of the waste-gate valve; and defining the WG0P2-estimation value or the CALP2-estimation value, whichever is higher, as a final-estimation-supercharge-pressure value, wherein the waste-gate valve is controlled based on the final-estimation-supercharge-pressure value.

2. The apparatus according to claim 1, wherein the ECU is configured to:

learn and correct, in the waste-gate-valve-driving condition, the effective aperture area of the throttle valve which is calculated in accordance with the intake-air amount, the pressure in the intake-manifold component, and the WG0P2-estimation value, and a relationship, which is previously set by using the aperture of the throttle valve, between the aperture of the throttle valve and the effective aperture area of the throttle valve, calculate the CALP2-estimation value based on the effective aperture area of the throttle valve that has been learned and corrected, the rotational speed of the internal combustion engine, and the pressure in the intake-manifold component, and define the WG0P2-estimation value or the CALP2-estimation value, whichever is higher, as the final-estimation-supercharge-pressure value.

3. The apparatus according to claim 1, wherein the ECU is configured to determine a pressure-ratio relationship between an atmospheric pressure and the WG0P2-estimation value corresponding to the exhaust-gas amount, in the waste-gate-valve-driving condition, store, as a first table, the determined pressure-ratio relationship, and determine the WG0P2-estimation value corresponding to the exhaust-gas amount by using the first table.

4. The apparatus according to claim 1, wherein the ECU is configured to perform a filtering process, by using a filter including a predetermined filter constant, with respect to the calculated WG0P2-estimation value.

5. The apparatus according to claim 1, wherein the ECU is configured to determine a relationship among the effective aperture area of the throttle valve, the rotational speed of the internal combustion engine, the pressure in the intake-manifold component, and the supercharge pressure, for a plurality of conditions of the waste-gate-valve in which the waste-gate valve is provided with an instruction different from the instruction of the 0% duty cycle, store, as a second table, the determined relationship among the effective aperture area of the throttle valve, the rotational speed of the internal combustion engine, the pressure in the intake-manifold component, and the supercharge pressure, and determine a pressure ratio between the pressure in the intake-manifold and the supercharge pressure, by using the second table, in accordance with the effective aperture area and the rotational speed of the internal combustion engine.

6. The apparatus according to claim 1, wherein the ECU is configured to calculate a target-supercharge-pressure value in accordance with the required output, and control the waste-gate valve in such a way that the final-estimation-supercharge-pressure value becomes the target-supercharge-pressure value in response to the target-supercharge-pressure value being higher than the WG0P2-estimation value.

* * * * *